Patented Oct. 17, 1922.

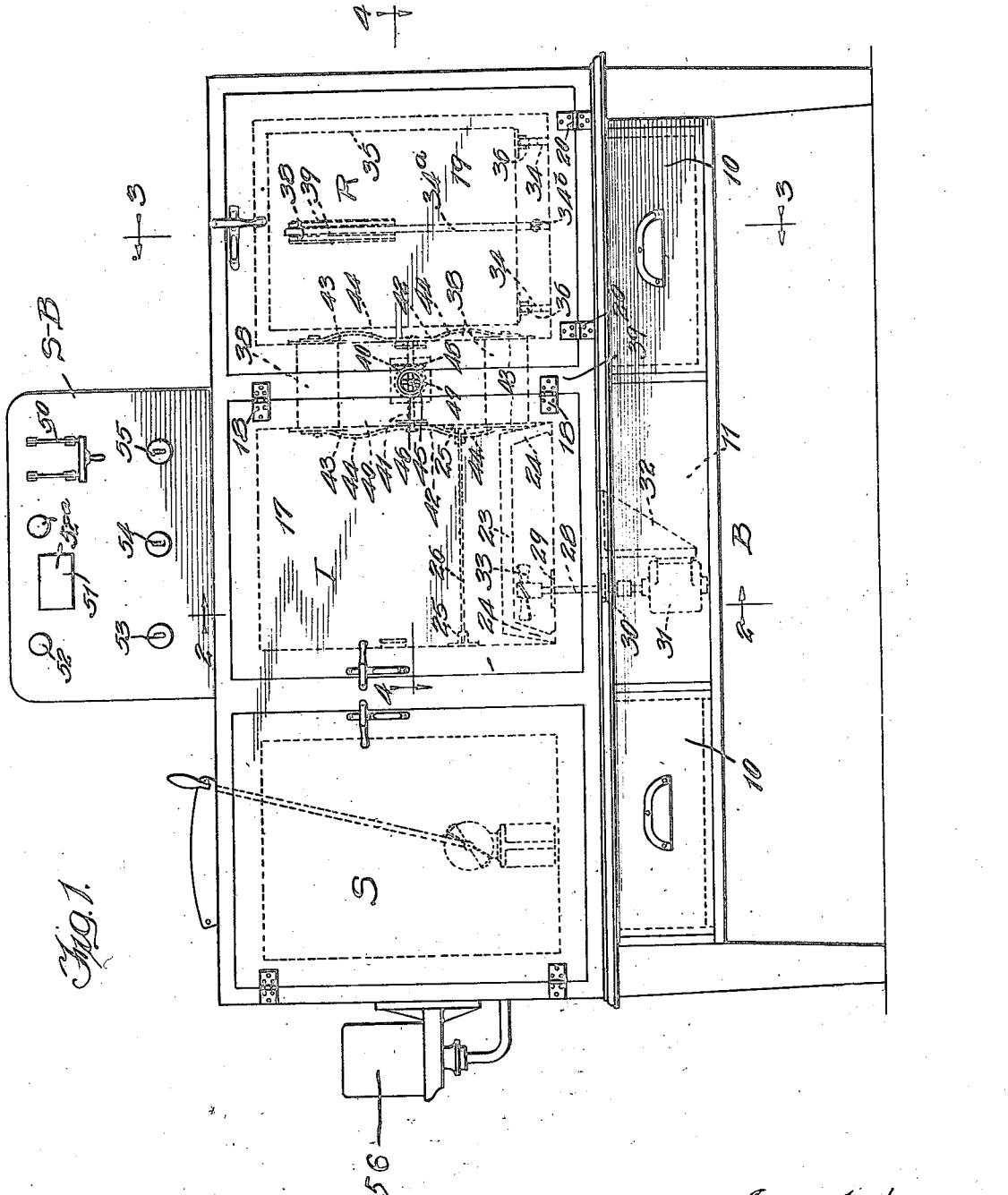

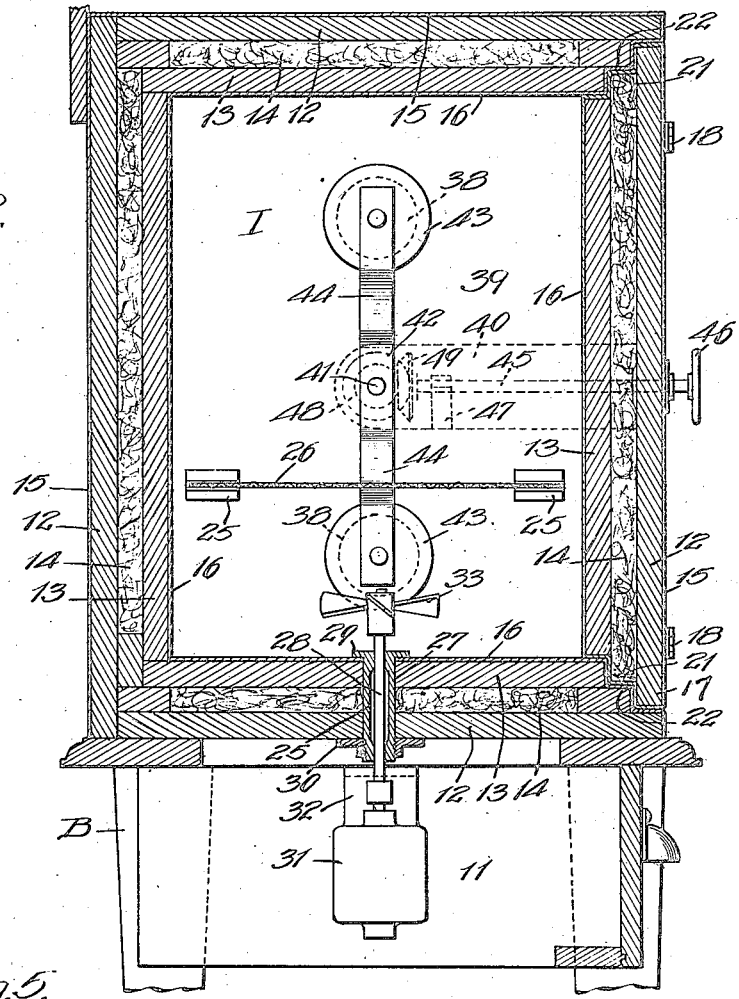
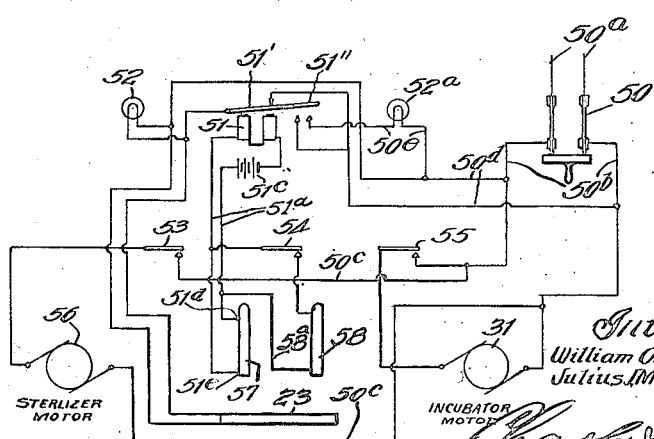

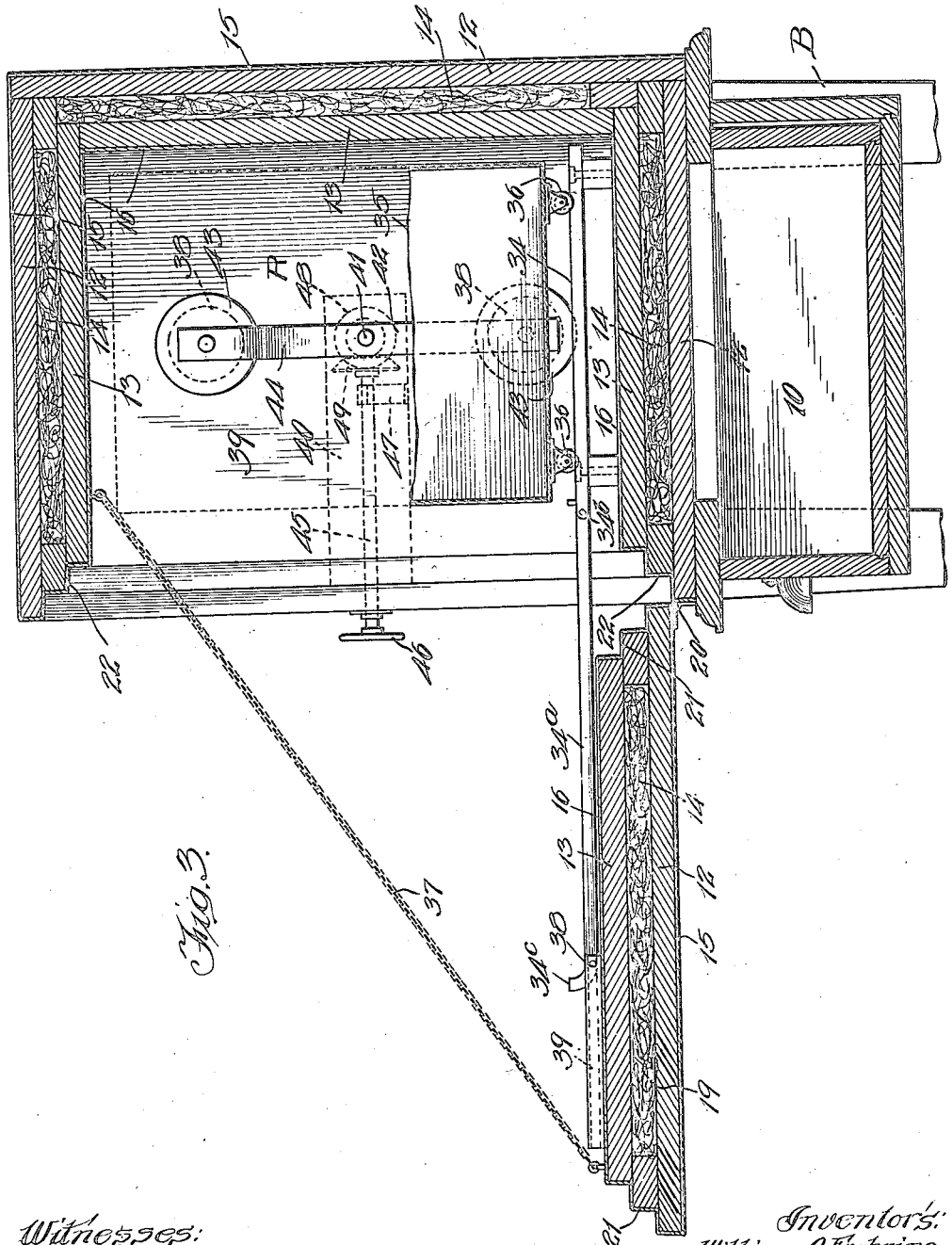

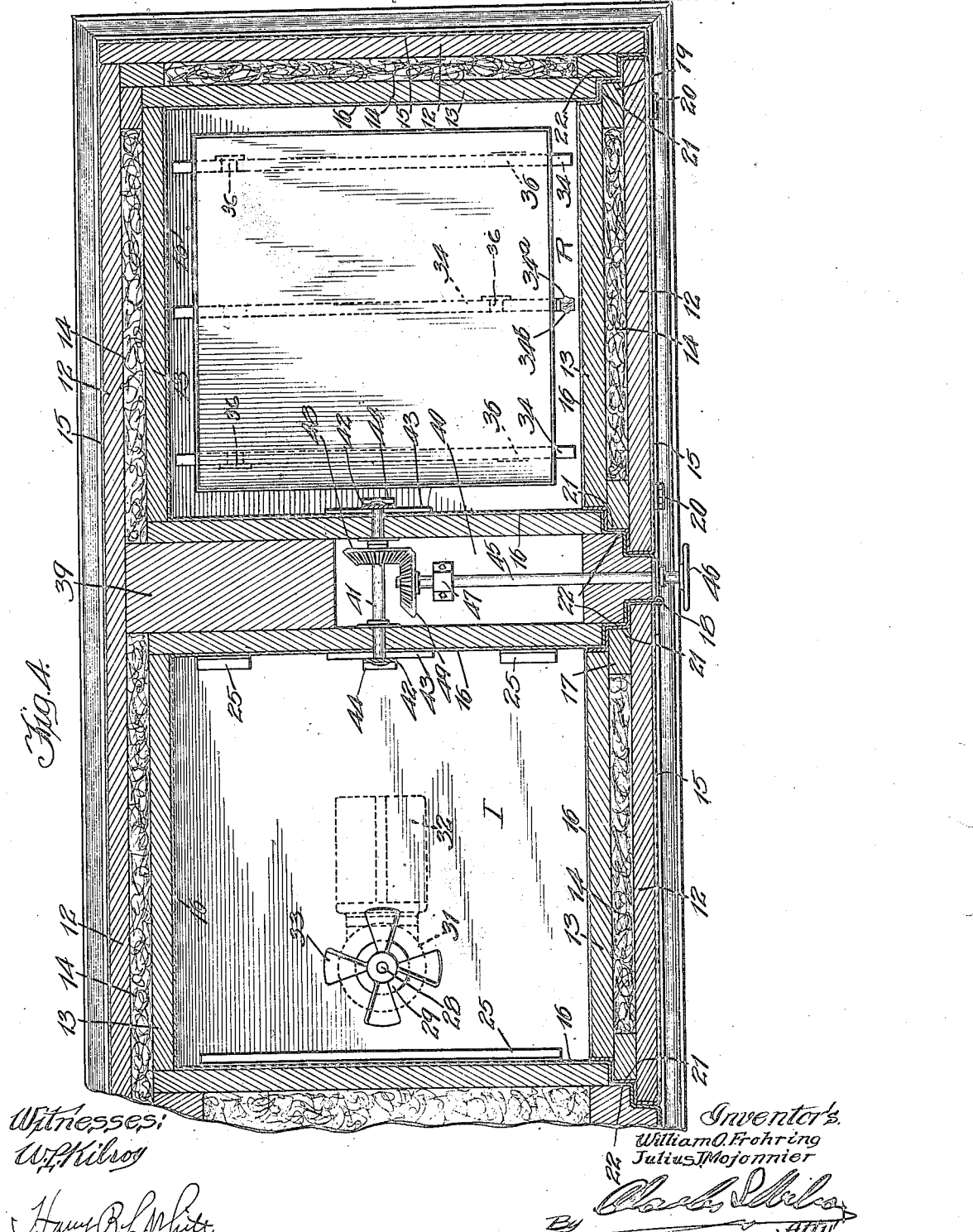

1,432,176

UNITED STATES PATENT OFFICE.

WILLIAM O. FROHRING, OF CLEVELAND, OHIO, AND JULIUS JOHN MOJONNIER, OF OAK PARK, ILLINOIS, ASSIGNORS, BY MESNE ASSIGNMENTS, TO MOJONNIER BROS. CO., OF CHICAGO, ILLINOIS, A CORPORATION OF ILLINOIS.

BACTERIOLOGICAL INCUBATOR.

Application filed May 2, 1919. Serial No. 294,284.

*To all whom it may concern:*

Be it known that we, WILLIAM O. FROHRING and JULIUS J. MOJONNIER, both citizens of the United States, and residents of Cleveland, in the county of Cuyahoga and State of Ohio, and Oak Park, in the county of Cook and State of Illinois, respectively, have invented certain new and useful Improvements in Bacteriological Incubators, of which the following is a specification.

This invention relates to new and useful improvements in incubators, combined with storage and refrigeration apparatus, for the propagation, development and storage of bacteriological cultures and has for its object the absolute and accurate control of the temperature within the incubator in order that the propagation, development, and growth of the cultures can be regulated and automatically supervised.

With the above and other objects in view, as will be apparent, this invention consists in the construction, combination and arrangement of parts, all as hereinafter more fully described, claimed and illustrated in the accompanying drawings, wherein:—

Fig. 1 is a front elevation of an apparatus embodying the incubator and the storage and refrigeration structure and construction forming the subject matter of the present invention;

Fig. 2 is a vertical section taken along line 2—2 of Fig. 1, through the incubator, to illustrate the construction thereof and especially the means whereby the temperature of all portions of the interior of the incubator is maintained the same by means of air circulation;

Fig. 3 is a similar section taken along line 3—3 of Fig. 1, through the refrigeration and storage apparatus, illustrating the track co-operating therewith and the door of the apparatus in its open position;

Fig. 4 is a horizontal section taken along line 4—4 of Fig. 1, and discloses the co-operation between the incubator and the storage and refrigeration apparatus, together with the means for controlling communication therebetween; and Fig. 5 is a diagrammatic view of the circuits through the medium of which the temperature within the incubator is automatically controlled.

In dairy practice there are three general classes of bacteria that are always under consideration and observation by the dairyman; the first, *Bacterium lactis acidi,* commonly known as lactic acid, because of its extreme usefulness; the second, *Bacterium lactis acidi aerogenes,* because of its total undesirability and the financial losses occasioned thereby; and the third, *Bacterium lactis acidi bulgaricus,* because of its somewhat limited usefulness. It is to propagate and grow the first and third, particularly the first, of these classes of bacteria, to-wit: *Bacterium lactis acidi,* and *Bacterium lactis acidi bulgaricus,* and to eliminate the second of these classes, to wit: *Bacterium lactis acidi aerogenes,* that the present invention is designed. That is to say, it is the object of the present invention to take a sample of milk in which all bacterial organisms and spores have been destroyed, inoculate it with a culture of *Bacterium lactis acidi* or *Bacterium lactis acidi bulgaricus,* and maintain the sample so inoculated under such conditions that the culture will propagate and grow until the entire sample is a culture of the inoculating bacteria, and at the same time the conditions are such that the *Bacterium lactis acidi aerogenes* cannot possibly be incubated or propagated, and if by any chance it should be, it would at once be overcome and destroyed by the lactic acid bacteria which under the conditions referred to are the stronger.

The *Bacterium lactis acidi* is the most useful and desirable bacterium to the dairyman because it produces a smooth solid curd, having a clean, sharp, sour taste but devoid of any odor, gas bubbles or separation of the whey. These bacteria when of a uniform quality and uncontaminated and free from the *Bacterium lactis acidi aerogenes* are invaluable in the production of buttermilk, cheese, butter and other dairy products and the products thus produced are of the very highest grade and command the highest market prices. These bacteria propagate or incubate between approximately sixty (60) and seventy (70) degrees Fahrenheit, and most readily and rapidly at or about sixty-eight (68) degrees Fahrenheit.

The *Bacterium lactis acidi bulgaricus,* while not as useful as the *Bacterium lactis acidi,* is of considerable use to the dairyman in that it is essential in the manufacture of what is commonly known as Bulgarian buttermilk, it being high in acid. These bacteria propagate or incubate approximately between ninety (90) and one hundred (100) degrees Fahrenheit, and most rapidly and readily at or about ninety-seven (97) degrees Fahrenheit.

The undesirability of the *Bacterium lactis acidi aerogenes* is because it is a gas producing bacterium that has and imparts an unpleasant flavor to the product in which it occurs, thereby creating a product that is very inferior if not a total loss, as in the case of cheese where it causes the cheese to swell and be for all intents and purposes worthless.

Of course, it will be understood that all of these classes of bacteria can be and are divided into various subclasses of bacteria, but for the present purposes the three general classes referred to are sufficient.

Manifestly, therefore, to produce a proper pure culture of *Bacterium lactis acidi*, or of *Bacterium lactis acidi bulgaricus*, with which to inoculate sterilized milk, it is necessary to inoculate a sample of sterilized milk with as nearly pure a culture of *Bacterium lactis acidi* or *Bacterium lactis acidi bulgaricus* as possible, and maintain the sample so inoculated at the temperature of sixty-eight (68) or ninety-seven (97) degrees Fahrenheit as the case may be, dependent upon the inoculating bacteria. Thus, the incubating bacteria will propagate most efficiently and at the same time the *Bacterium lactis acidi aerogenes* will be eliminated entirely.

Heretofore, while it has, in a few instances, been possible to maintain a bacterial culture for a somewhat lengthy period under the most favorable conditions, usually in a research laboratory, it has been impossible to maintain and develop a pure and uniform culture commercially, without renewing the culture from a bacteriological laboratory at stated periods, usually every week or two. Hence, as the culture must be renewed, it must be gradually deteriorating and as the quality of the commercial product depends directly upon the quality of the culture by means of which it is made, the product such as butter, cheese, etc., made from such a culture is not uniform in quality and therefore does not command the highest market price for this reason.

The present invention is a part of an apparatus for carrying out a method or process of propagating or incubating a pure bacteriological culture which may be maintained indefinitely without renewal and will improve constantly rather than deteriorate. Thus, a uniform or constantly improving culture may be maintained, and the product made therewith will be uniform or constantly improving as to quality. To do this, it is very essential that the incubation and storage of the culture shall be under conditions most favorable to the bacteria to be propagated and unfavorable to all other bacteria.

It is, therefore, the purpose of the present invention to provide an incubator wherein the temperature will be automatically maintained at or about sixty-eight (68) or ninety-seven (97) degrees Fahrenheit in order that a sample of sterilized milk inoculated with *Bacterium lactis acidi* or *Bacterium lactis acidi bulgaricus* respectively may develop and propagate as rapidly as possible into a pure culture and to further provide a means of storing the culture thus produced to maintain the same at a temperature where the culture will not become spoiled or contaminated.

As before stated, this invention is a part of an apparatus designed to carry out a method whereby anyone skilled in the dairy art may make and propagate an absolutely pure and uniform culture indefinitely without renewal. Inasmuch as the balance of the apparatus and the method referred to constitute the subjects matter of separate applications filed simultaneously herewith, viz:— William O. Frohring, method and process of incubating and propagating bacteriological cultures, filed May 2, 1919, Serial Number 294,350; and William O. Frohring and Julius J. Mojonnier, sterilizers, filed May 2, 1919, Serial Number 294,283, it will be unnecessary to enlarge upon the same in the present application.

In carrying out the present invention a base B is provided and is of any suitable construction for supporting the sterilizer S, the incubator I and the storage and refrigeration apparatus R. The sterilizer S is for the treating of a sample of milk so that all organisms, bacteria and spores are absolutely destroyed and killed and as it forms no part of the present application it is unnecessary to more specifically refer thereto than to explain its general function as forming a part of the apparatus, along with the present invention, designed when taken together to carry out a method and process for propagating and indefinitely maintaining a uniformly pure culture of bacteria. The incubator I and the storage and refrigeration apparatus R are of prime interest here.

The base B has the sterilizer S at one end and the storage and refrigeration apparatus R at its opposite end, while the incubator I is located therebetween. Such an arrangement makes it possible to start at the left of the base B and successively use the apparatus to properly carry out the method of propagating and indefinitely maintaining a uniformly pure culture of *Bacterium lactis acidi*, or *Bacterium lactis acidi bulgaricus*, as aforesaid. Mounted in the base B under the sterilizer S and the storage and refrigeration apparatus R are the drawers 10 for the reception and storage of supplies, the space 11 between said drawers being devoted to the mounting of the motor that drives the circulation fan or blower of the incubator I, as will be hereinafter more fully described.

The wall, door, (other than the mounting thereof), top and bottom of both the incubator I and the storage and refrigeration apparatus R is the same in both instances and constitutes an insulated construction that will prevent the temperature of the atmosphere surrounding the apparatus from affecting that of the interior thereof and vice versa. This construction embodies an outer wall 12 and an inner wall 13 separated by a gap filled with an insulating material 14 such as cork, charcoal, mineral wool or the like, which prevents radiation from within the apparatus or the affecting of the temperature of the interior thereof by that of the atmosphere surrounding the same. A covering 15 of sheet metal is secured to the outer wall 12 of all portions of both the incubator I and the storage and refrigeration apparatus R, except the bottoms thereof which rest directly upon the base B. Likewise a similar metal covering 16 is attached to the inner wall 13 throughout the entire structure.

The incubator I has a door 17 which swings about the vertical hinges 18; while the storage and refrigeration apparatus R is provided with a door 19 which swings about the horizontal hinges 20 located at the bottom of said apparatus. Inasmuch as both the doors 17 and 19 and the walls of the incubator I and the storage and refrigeration apparatus R are of double construction, in that they are all composed of the inner wall 13 and the outer wall 12, it is possible to have the stepped edges 21, with which the doors 17 and 19 are provided, co-operate and interengage with the similar stepped edges 22 of the walls of their respective apparatus. The inner metallic coverings 16 of the doors 17 and 19 and the walls of the co-operating apparatus are extended over the stepped edges 21 and 22 respectively.

A hot plate or griddle 23 is supported on the legs 24 on the interior of the incubator I in a position elevated from the bottom of the incubator. Upon each side wall of the incubator I and parallel to the hot plate 23 are the brackets 25, said brackets 25 resting in a common plane removed from and parallel to the plane of said hot plate. It is upon these brackets 25 that the gauze or perforated shelf 26 rests to support the receptacles containing the inoculated samples of milk during the period of incubation, said shelf being made of gauze or perforated to permit a free circulation through and about the same and the receptacle resting thereon.

A bushing or bearing 27 pierces the bottom of the incubator I adjacent the wall thereof removed from the wall dividing the incubator I from the storage or refrigeration apparatus R and medially of the depth of said incubator, where it acts as a journal for the fan or blower shaft 28. In order to retain this bushing or bearing 27 in place, the upper end thereof is provided with an outstanding flange 29 that rests flush against the interior surface of the bottom of the incubator I, while its lower end is threaded to receive the clamp nut 30 which bears against the exterior surface of the bottom of the incubator I. The lower end of the fan or blower shaft 28 terminates in or is connected to the shaft of an electrical motor 31 carried by the bracket 32, secured to the under side of the bottom of the incubator I to one side of the shaft 28 and motor 31. At its upper end the shaft 28 has the fan or blower 33 keyed or otherwise fixed thereto, and thus located below the hot plate or griddle 23.

From the foregoing it is clear that the fan or blower 33 will circulate the air within the incubator I through the hot plate or griddle 23 and along the wall of the incubator adjacent said fan or blower, across the top thereof, down the opposite wall, and again through the hot plate. In this manner temperature within the incubator is the same at all points and varies only as the control, to be hereinafter described, varies. By having the shelf 26 perforated or formed of gauze, this circulation may be carried on through the shelf and about the receptacles thereon.

Within the storage and refrigeration apparatus and on the bottom thereof, is mounted a series of parallel tracks 34 upon which operates a truck consisting of the tank 35 and the rollers 36 under the same, said rollers engaging the tracks aforesaid. The tank 35 occupies the majority of the space in the apparatus R and is designed to receive ice which serves the double purpose of co-operating with the hot plate 23 of the incubator I to regulate the temperature therein, as will be hereinafter apparent, and of maintaining a relatively low temperature in the tank 35. It is in this tank 35 that the receptacles containing the cultures incubated in the incubator I are placed, after being removed from said incubator, the ice within the tank surrounding the receptacles so containing the cultures.

The door 19 of the apparatus R when open rests in a horizontal position and is supported by the chains 37 extending from each side of the outer terminal of said door to the upper end of each side wall of said apparatus and when in this position the door 19 acts as a table for the truck upon the same being removed from the apparatus R to be filled either with ice, receptacles full of culture, or both. To facilitate this one of the tracks 34 has an extension track 34ª pivoted to its outer terminal as at 34ᵇ, through the medium of which said extension track may swing with the door, 19 to which it is slidably connected by means of the pin 38 arranged transversely thereof adjoining its outer end, and being reciprocatingly engaged between the guides 39 medially attached to the door near its free edge. At the outer terminal thereof, the extension track 34ᵃ is curved outwardly as at 34ᶜ to create a stop for the truck, thereby preventing it from leaving the tracks 34 and 34ᵃ when it is withdrawn from the apparatus R. In operation the door 19 may be lowered until it assumes a horizontal position where it will be supported by the chains 37, as illustrated in Fig. 3, at which time the truck may be operated along the tracks 34 and 34ᵃ, and be thus removed from the apparatus R. This locates the central roller 36 on the extension track 34ᵃ and the side rollers remain on the tracks 34 within the apparatus so that ready access may be had to the tank 35 for the purpose of filling it with ice, or packing receptacles containing cultures in ice therein.

It is clear that the incubator I in itself only contains a source of heat (to-wit: the hot plate or griddle 23), while the storage and refrigeration apparatus R in itself only embodies a means of maintaining a relatively low temperature and in order to utilize the latter in regulating the temperature within the incubator I a connection or means of communication is provided between the two; thereby making it possible for the fan or blower 33 to pass the heated air in the incubator through the refrigeration and storage apparatus when the temperature thereof is above that desired. To accomplish this two vertically alined horizontal ports or passages 38 pierce the wall 39 between the incubator I and the storage and refrigeration apparatus R, one adjacent the top and the other adjacent the bottom thereof. One of these passages or ports 38 is located at or adjacent to the top of the wall 39 while the other is at or adjacent to the bottom of said wall; both of said ports or passages being aligned vertically and medially of the depth of the incubator I, and the storage and refrigeration apparatus R. When circulation is free through the ports or passages 38 the operation of the fan or blower 33 will force the air from the incubator I through the upper of said ports or passages into the storage or refrigeration apparatus R, where it will circulate freely, returning to the incubator by way of the lower port or passage. This action reduces the temperature of the air passing through the apparatus R and in combination with the hot plate or griddle 23 operates to accurately and definitely determine the temperature within the incubator I.

In order to prevent circulation through the ports or passages 38 the wall 39 is provided with a cavity 40 centrally of its height and adjoining the fore part of the machine, said cavity being entirely enclosed by the wall 39 as illustrated in Fig. 4. A horizontal shaft 41 is arranged transversely of the cavity 40 and pierces the wall 39 at each end thereof, so that a portion of the said shaft projects into both the incubator I and the apparatus R. These projecting ends of the shaft 41 have the resilient bars 42 fixed thereto, the terminals of each of which are aligned with the ports or passages 38 upon the bars occupying vertical positions as illustrated in the drawings. At their ends the bars 42 carry the disks 43 which, when the said bars occupy vertical positions as shown, act as closures for the ports or passages 38, to cut off circulation through the same. To insure an air tight closure for the ports or passages 38, the bars 42 are arched as at 44 between the ends thereof and the projecting ends of the shaft 41, thus making the disks 43 spring pressed against the contacting surfaces of the wall 39 and creating a sufficiently tight contact between the wall and the disks to effectively stop circulation through said ports when the disks 43 register with them.

Manifestly, by oscillating the shaft 41 a similar action will be imparted to the bars 42 and the disks 43 to register the latter with the ports or passages 38 or to move them out of registration therewith dependent on the movement transmitted to the shaft 41. This is accomplished by the control shaft 45 extending longitudinally of the cavity 40, terminating at its rear end near the shaft 41, and at its forward end projecting from the front vertical edge or face of the wall 39 where it can be freely manipulated by the hand wheel 46 fixed thereto at this point or by any other suitable means. The rear end of the shaft 45 is supported by and operates in the bearing 47 secured to the floor of the cavity 40. That the manipulation of the control shaft 45 by the hand wheel 46 or otherwise may be transmitted to the shaft 41 the latter has a beveled gear 48 keyed to it which meshes with a similar gear 49 keyed to the former, thus providing a direct drive between said shafts.

From the foregoing it becomes at once apparent that the present invention includes a low temperature incubator, the temperature of which may be regulated in part by means of a storage and refrigeration apparatus through the medium of an air circulation through the incubator and the apparatus aforesaid. This circulation of air also maintains the temperature within the incubator the same at all points, thus eliminating all variations that might affect the efficiency of the entire apparatus.

The further regulation of the temperature in the incubator I is accomplished through the hot plate or griddle 23, in that the same is automatically operated or shut off as conditions necessitate or require. This is accomplished by means of a thermostatic control located within the incubator I and operable to control the making or breaking of the circuit of the hot plate or griddle 23 when the temperature within the incubator I exceeds that required or desired, in this instance either 68° or 97° Fahrenheit favorable respectively to the propagation and incubation of the *Bacterium lactis acidi* or *Bacterium lactis acidi bulgaricus*, in combination with signals here shown in the form of lamps, one of which will indicate the operation of the hot plate or griddle 23 and the other of which will indicate the non-operation of the hot plate or griddle 23. In this manner the operator is automatically made aware of the temperature conditions within the incubator I and may manually regulate the means of communication between the incubator I and the storage and refrigeration apparatus R. This mechanism is illustrated diagrammatically in Fig. 5 and in Fig. 1 is shown the switchboard S—B carrying the switches, lamps, signals, etc., used in the electrical control of the incubator and other apparatus.

In carrying out the electrical control aforesaid switchboard S—B is provided, on which is mounted the line switch 50, the relay 51, the red lamp 52, the green lamp 52$^a$ and the snap switches 53, 54 and 55. The line circuit 50$^a$ terminates in the line switch 50 from which is taken the circuit 50$^b$ for the incubator motor 31 and the circuit 50$^c$ for the sterilizer motor 56. The first of these circuits 50$^b$ is controlled by the snap switch 55, whereby the incubator motor 31 may or may not be operated, dependent upon the adjustment of the switch 55, whereas the second of these circuits 50$^c$ is controlled by the snap switch 53, whereby the sterilizer motor 56 is or is not operated upon the adjustment of the said snap switch. A third circuit 50$^d$ is taken from the line switch 50, and includes the hot plate 23. This circuit is bridged by the red lamp 52 and hence when the circuit 50$^d$ is closed, the hot plate 23 will be in operation and the lamp 52 lit. The relay 51 above referred to is provided for the making and the breaking of the hot plate circuit 50$^a$, the armature 51′ of said relay normally closing the hot plate circuit 55. A normally open circuit 51$^a$ includes the relay 51, the thermostatic control 57 and the battery or other source of current supply 51$^c$. The open condition of the circuit 51$^a$ is maintained by the separated terminals 51$^d$ and 51$^e$ of the thermostatic control 57, said control constituting a thermometer wherein a rise in temperature will cause the column of mercury thereof to rise, connecting the terminals 51$^d$ and 51$^e$. The thermostatic control 57 is so adjusted that when the temperature surrounding the same exceeds 97° Fahrenheit, the column of mercury within the control will connect the terminals 51$^d$ and 51$^e$ of the circuit 51$^a$, thus closing the circuit and energizing the relay 51. This causes the armature 51′ of the relay 51 to be attracted to the coils of the relay, thereby breaking the circuit 55, extinguishing the lamp 52 and cutting off the hot plate 53. Simultaneously with breaking the hot plate circuit 50$^d$, the armature 51′ closes the circuit 50$^e$ bridged across the circuit 50$^d$, including the green lamp 52$^a$, by means of a block 51″ insulated from the body of the armature 51′. Manifestly, therefore, when the circuit 51$^a$ is closed, the hot plate circuit 50$^d$ is broken and the lamp 52 extinguished, and simultaneously therewith the circuit 50$^e$ of the green lamp 52$^a$ is closed, lighting said lamp and automatically indicating to the operator that the hot plate circuit is broken. As soon as the temperature within the incubator I falls to 97° Fahrenheit or below, the column of mercury within the thermostatic control 57 will cease to serve as a connection between the terminals 51$^d$ and 51$^e$, and the circuit 51$^a$ will consequently be broken. The armature 51′, as a result of the breaking of the circuit 51$^a$ will fall away, resuming its normal position, where it closes the circuit 51$^a$. This action of the armature naturally breaks the green lamp circuit 50$^e$, causing the lamp 52$^a$ to be extinguished, and the lamp 52 to be lit.

In order, however, to cause the temperature within the incubator I to be maintained around 68° Fahrenheit, a second thermostatic control 58 is provided and is bridged across the circuit 51$^a$ by means of the auxiliary circuit 58$^a$. This auxiliary circuit also includes the snap switch 54 by means of which the auxiliary circuit 58$^a$ may be opened or closed, determined by whether or not it is desired to make the thermostatic control 58 effective. When the snap switch 54 is closed, a rise of temperature within the incubator I beyond 68° Fahrenheit will cause the column of mercury within the thermostatic control 58, which in all respects except adjustment is identical with the thermostatic control 57, to close the normally open auxiliary circuit 58$^a$ and consequently close the main control circuit 51$^a$ with the result that the hot plate circuit 23 is broken and the lamps 52, and 52$^a$ controlled as before described.

From the foregoing it will be observed that when the thermostatic control 58 is effective the circuit 51$^a$ will be closed prior to any control thereof by the thermostatic control 57. In other words the closing of the snap switch 54 sets the apparatus for the propagation of *Bacterium lactis acidi*. On the contrary the opening of the switch 54 by rendering the control 58 non-effective sets the apparatus for the propagation of *Bacterium lactis acidi bulgaricus*.

It is, of course, manifest that the electrical arrangements for the control of the temperature within the incubator I can be varied and the details thereof considerably changed without departing from the scope and spirit thereof.

What is claimed is:

1. The combination with a bacteriological incubator, of a source of heat therein, a thermostatic control for said source of heat, and means for distributing the resulting heat uniformly throughout the entire incubator.

2. The combination with a bacteriological incubator, of a hot plate therein, a thermostatic control for said hot plate, and means for distributing the heat generated by said hot plate uniformly throughout the entire incubator.

3. The combination with a bacteriological incubator, of means for creating a predetermined temperature therein, and means for creating a circulation within said incubator for maintaining a uniform temperature throughout the entire incubator.

4. The combination with a bacteriological incubator, of means for maintaining a predetermined temperature therein, and a fan for creating a circulation within said incubator.

5. The combination with a bacteriological incubator, of a hot plate therein, a thermostatic control for said hot plate, and means for uniformly distributing the heat generated by said hot plate throughout the incubator and reducing the temperature within the incubator when the hot plate ceases to generate heat under the thermostatic control aforesaid.

6. The combination with a bacteriological incubator, of a hot plate therein, a thermostatic control for said hot plate, and a fan adapted to uniformly distribute the heat created by the hot plate.

7. The combination with a bacteriological incubator, of a hot plate therein, a thermostatic control for said hot plate, and a fan adapted to uniformly distribute the heat created by the hot plate and reduce the temperature within the incubator when the hot plate ceases to generate heat under the thermostatic control aforesaid.

8. The combination with a bacteriological incubator, of a hot plate therein, a thermostatic control for said hot plate, a fan adapted to uniformly distribute the heat created by the hot plate and reduce the temperature within the incubator when the hot plate ceases to generate heat under the thermostatic control aforesaid, and a perforated shelf above said fan and hot plate.

9. The combination with an incubator, of a refrigeration apparatus, means of communication between said incubator and said refrigeration apparatus, and means for creating a circulation through said means of communication between said incubator and said refrigeration apparatus.

10. The combination with an incubator, of a refrigeration apparatus, multiple means of communication between said refrigeration apparatus and said incubator, means for creating a circulation through said multiple means of communication between said incubator and said refrigeration apparatus, and closures for said means of communication.

11. The combination with an incubator, of a refrigeration apparatus, multiple means of communication between said refrigeration apparatus and said incubator, means for creating a circulation through said multiple means of communication between said incubator and said refrigeration apparatus, and means for simultaneously adjusting the closures for said means of communication aforesaid.

12. The combination with an incubator, of an adjoining refrigeration apparatus, and a wall separating said incubator and said refrigeration apparatus having a plurality of passages comprising the same and constituting means of communication between said incubator and said refrigeration apparatus.

13. The combination with an incubator, of an adjoining refrigeration apparatus, a wall separating said incubator and said refrigeration apparatus having a plurality of passages piercing the same and constituting means of communication between said incubator and said refrigeration apparatus, and closures for said passages.

14. The combination with an incubator, of an adjoining refrigeration apparatus, a wall separating said incubator and said refrigeration apparatus having a plurality of passages piercing the same and constituting means of communication between said incubator and said refrigeration apparatus, and closures for the terminals of said passages.

15. The combination with an incubator, of an adjoining refrigeration apparatus, a wall separating said incubator and said refrigeration apparatus having a plurality of passages piercing the same and constituting means of communication between said incubator and said refrigeration apparatus, closures for said passages, and means for operating said closures to render said means of communication effective or non-effective.

16. The combination with an incubator, of an electrical heat generator therein, two thermostatic controls within said incubator, and means cooperating with said controls whereby either of said controls render said heat generator effective or non-effective.

17. The combination with an incubator, of a heat generator therein, a thermostatic control for said heat generator whereby said generator is made effective or non-effective, and a signal to communicate the effectiveness or non-effectiveness of said generator.

18. The combination with an incubator, of an electrical heat generator therein, a thermostatic control adapted to render said generator effective or non-effective and signals under the control of said thermostatic control for indicating the effectiveness and non-effectiveness of said generator.

19. In an incubator the combination with a cabinet, of a hot plate therein, and a fan below said hot plate and adjoining one wall of said cabinet.

20. In an incubator the combination with a cabinet, of a hot plate therein, and means below said hot plate and adjoining one wall of said cabinet for creating an even distribution of heat generated by said hot plate.

21. In an incubator the combination with a cabinet, of a hot plate therein adjacent the bottom thereof, and a fan under said hot plate and adjacent one wall of said cabinet for creating even distribution of the heat from said hot plate.

22. In an incubator the combination with a cabinet, of a hot plate therein, and a fan below said hot plate to evenly distribute the heat created by said hot plate.

23. In an incubator the combination with a cabinet, of a refrigerator connected with said cabinet by superposed passages, and a fan adjoining the bottom and one wall of said cabinet.

24. In an incubator the combination with a cabinet, of a refrigerator connected with said cabinet by superposed passages, and a fan adjoining the bottom and one wall of said cabinet to create a circulation from the cabinet through the upper of said passages to said refrigerator and back to the cabinet through the lower of said passages.

25. In an incubator the combination with a cabinet, of a refrigerator connected with said cabinet by a plurality of passages, and means in said cabinet for creating a circulation from said cabinet through part of said passages to and through said refrigerator and back to said cabinet by way of the remaining passages.

26. In an incubator the combination with a cabinet, of a refrigerator connected with said cabinet by a plurality of passages, a hot plate in said cabinet adjacent the bottom thereof, and a fan below said hot plate and adjoining one wall of said cabinet.

27. In an incubator the combination with a cabinet, of a refrigerator connected with said cabinet by a plurality of passages, a hot plate in said cabinet adjacent the bottom thereof, and a fan below said hot plate and adjoining one wall of said cabinet to create a circulation within said cabinet.

28. In an incubator the combination with a cabinet, of a refrigerator connected with said cabinet by a plurality of passages, a hot plate in said cabinet adjacent the bottom thereof, and a fan below said hot plate and adjoining one wall of said cabinet to create a circulation within said cabinet and also from said cabinet through part of said passages to and through said refrigerator and back to said cabinet through the remaining passages.

29. The combination with an incubator cabinet, of a refrigerator connected with said cabinet by a plurality of passages, and closures in said cabinet and said refrigerator for sealing said passages.

30. The combination with an incubator cabinet, of a refrigerator connected with said cabinet by a plurality of superposed passages, a shaft located medially of said passages, spring bars at the ends of said shaft, and closures for said passages carried by said bars.

31. The combination with an incubator cabinet, of a refrigerator connected with said cabinet by a plurality of superposed passages, bars in said cabinet and said refrigerator, and closures for said passages at the ends of said bars.

32. The combination with an incubator cabinet, of a refrigerator connected with said cabinet by a plurality of superposed passages, a shaft located medially of said passages, spring bars at the ends of said shaft, closures for said passages carried by said bars, and means for oscillating said shaft.

33. The combination with an incubator cabinet, of a refrigerator connected with said cabinet by a plurality of superposed passages, bars in said cabinet and said refrigerator, closures for said passages carried by bars, and means for operating said bars.

34. The combination with an incubator cabinet, of a refrigerator connected with said cabinet by a plurality of superposed passages, bars in said cabinet and said refrigerator, closures for said passages carried by bars, and means for operating said bars to simultaneously seal said passages.

WILLIAM O. FROHRING.
JULIUS JOHN MOJONNIER.